United States Patent

Peters

Patent Number: 5,454,440
Date of Patent: Oct. 3, 1995

[54] SIDEWALL AIR CUSHION VEHICLE

[75] Inventor: Thomas Peters, Lüneberg, Germany

[73] Assignee: MTG Marinetechnik GmbH, Germany

[21] Appl. No.: 170,265

[22] PCT Filed: Apr. 28, 1993

[86] PCT No.: PCT/EP93/01030

§ 371 Date: Aug. 1, 1994

§ 102(e) Date: Aug. 1, 1994

[87] PCT Pub. No.: WO93/22714

PCT Pub. Date: Nov. 11, 1993

[30] Foreign Application Priority Data

Apr. 30, 1992 [DE] Germany .................. 42 14 450.7

[51] Int. Cl.⁶ ............................................. B60V 1/12
[52] U.S. Cl. ................................... 180/118; 180/126
[58] Field of Search ............................... 180/116, 117, 180/118, 120, 121, 122, 126; 114/67 A, 288, 289, 290, 292

[56] References Cited

U.S. PATENT DOCUMENTS 3,850,126 11/1974 Leonard ........................... 114/67 A
4,029,036 6/1977 Magnuson ........................ 114/67 A

FOREIGN PATENT DOCUMENTS 0365700 5/1990 European Pat. Off. .
2068772 12/1970 France .
560 1/1991 Japan ............................... 180/126
136636 3/1961 U.S.S.R. ............................ 180/121
1247512 9/1971 United Kingdom ............. 180/126
2075936 11/1981 United Kingdom .

Primary Examiner—Mitchell J. Hill
Assistant Examiner—Kevin Hurley
Attorney, Agent, or Firm—Faegre & Benson

[57] ABSTRACT

A sidewall air cushion vehicle or side effect ship (SES) includes a pair of parallel body members which are connected to each other by a rigid structure above the water surface, a flexible bow skirt in the front of the vehicle and a flexible stern skirt in the rear of the vehicle, an air cushion space between said bow and stern skirts, partition means extending transversely to the fore-aft-direction of the vehicle and dividing said space at substantially the mid thereof so as to provide a pair of compartments which are separated from each other by said partition means in a substantially fluid tight manner, at least one fan means for generating air cushions in said compartments, and sensor means for sensing the pitch angle or the pitch angle velocity of the vehicle to be used as control parameters for control of the pressure of the air in the compartments; the partition means and/or a bypass passage bypassing said partition means includes flow control means having an adjustable flow cross section and adapted to be actuated by actuating means which is controlled by said control means so that said flow cross section is adjusted in response to the pitch angle and/or the pitch angle velocity of the vehicle and/or the pressures in said compartments.

14 Claims, 2 Drawing Sheets

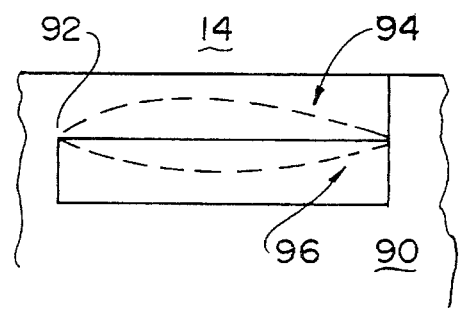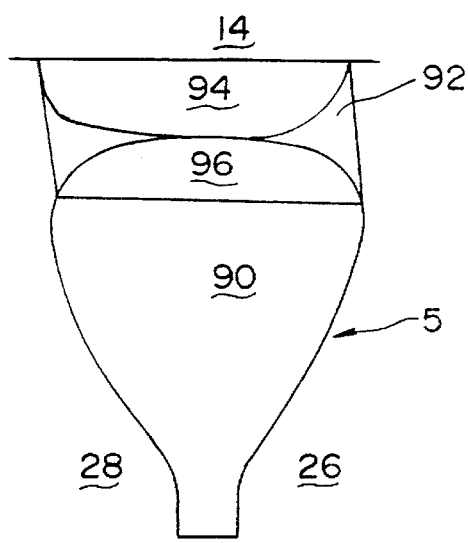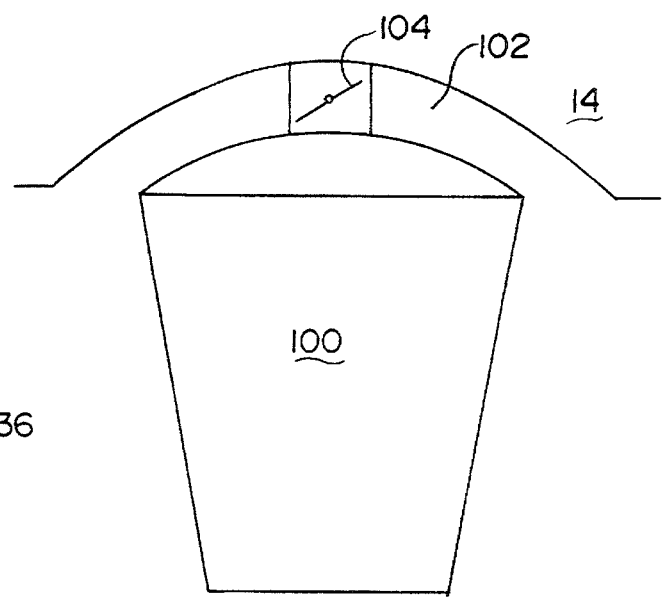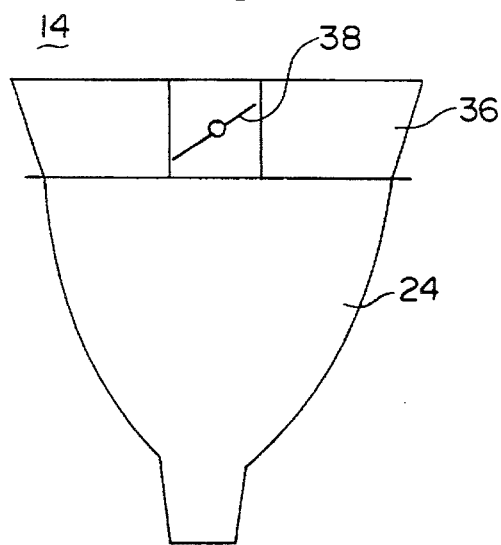

SIDEWALL AIR CUSHION VEHICLE

The present invention relates to a sidewall air cushion vehicle or surface effect ship (SES).

European patent application 0 365 700 discloses a sidewall air cushion vehicle including a pair of body members which are connected to each other by a rigid structure above the water surface. The front and the rear of the vehicle each include a flexible skirt to prevent escape of air which has been fed from above by a fan. This allows the vehicle to be raised by an air cushion such that the inner portions of the body members are hardly immersed in the water. From this follows a reduced drag enabling to achieve high velocities of the vehicle at a low drive energy consumption rate. Unfortunately, this advantage is accompanied by the generation of substantial movement of the vehicle at rough sea, in particular due to the fact that substantial amounts of the air may escape from the air cushion to all sides due to movements of the vehicle.

Furthermore the sidewall air cushion vehicle of European patent specification 0 365 700 includes, between the bow and stern skirts, a transverse partition means dividing the air cushion space into a pair of compartments. At least one fan is provided to maintain the air cushion in each compartment. Furthermore, a flap valve or the like is provided to arbitrarily reduce the pressure of the air cushion. The partition means which generally comprise a skirt maintains a pressure difference between the compartments. It may be of a structure such that it is relatively soft and flexible when substantially the same pressures prevail in the compartments, while it becomes relatively stiff as a result of a pressure difference between the compartments. Such a partition means allows to control the pitch movements of the vehicle by controlling the pressure difference between the compartments. This may be obtained in a passive manner by having the pressure differentials generated as a result of vertical movements of the vehicle and wave movements within the air cushions dampen pitch movements of the vehicle. An active control is obtained by sensing control parameters such as vertical velocity or acceleration of the front of the vehicle or another parameter dependent on movements of the front of the vehicle, by sensing the wave contours or by sensing the air pressures in the compartments. An actively controlled dampening effect is obtained by arbitrary pressure increases or decreases in opposition to pitch movements of a vehicle.

However, it was found that control of the air pressures in the compartments results in substantial air losses.

It is an object of the present invention to provide a sidewall air cushion vehicle or surface effect ship which exhibits improved riding characteristics, in particular improved pitch attitude characteristics. A further object is to avoid or reduce air losses.

To this end the present invention provides a sidewall air cushion vehicle comprising a pair of parallel body members which are connected to each other by a rigid structure above the water surface, a flexible bow skirt in the front of the vehicle and a flexible stern skirt in the rear of the vehicle, an air cushion space between said bow and stern skirts, partition means extending transversely to the fore-aft-direction of the vehicle and dividing said space at substantially the mid thereof so as to provide a pair of compartments which are separated from each other by said partition means in a substantially fluid tight manner, at least one fan means for generating air cushions in said compartments, and sensor means for sensing the pitch angle or the pitch angle velocity of the vehicle to be used as control parameters for control of the pressure of the air in said compartments, said partition means including flow control means having an adjustable flow cross section and adapted to be actuated by actuating means, said actuating means being controlled by said sensor means so that said flow cross section of said flow control means is adjusted in response to the pitch angle and/or the pitch angle velocity of the vehicle and/or the pressures in said compartments.

If differential pressures are generated in the compartments due to motion of the sea, this is an indication of the vehicle performing e.g. pitch movements. A suitable pressure condition in the compartments may be used to oppose the pitch movements of the vehicle as is known per se. In view thereof, the present invention provides flow control means for the partition means to provide for a more or less substantial pressure balance in response to pitch movements of the vehicle and/or the pressure difference between the compartments. Accordingly it is no longer necessary to open an air venting flap for a pressure increase and thereafter to rebuild a pressure by means of a fan to compensate for the pitch movements of the ship as a result of the next wave. The flow control valve of the present invention provides for a distribution of the pressures in the compartments such that the desired pressure difference is obtained in each case while air losses are avoided.

It would be possible to set the flow control means at a fixed value. This in itself would result in an improved pitch attitude. Since, however, such a fixed value would be limited to predetermined motions of the sea, the present invention provides to control the flow cross section of the flow control means in response to any motion of the sea, i.e. the sensed pitch angle and/or the pitch angle velocity.

From U.S. Pat. No. 3,850,126 it has become known to provide a bypass passage including restricting means for bypassing a partition skirt of an air cushion vehicle. With air cushion vehicles buoyancy of the vehicle is obtained exclusively by the air cushion below the vehicle. Accordingly, there is no possibility as with other types of ships to increase the buoyancy by increased immersion of the ship as a result of increased or uneven loading. This is why in air cushion vehicles a differential pressure in the compartments is absolutely necessary in order to allow for an uneven load distribution. It is to be noted that such a pressure distribution between the compartments is not adapted to improve the riding characteristics of an air cushion vehicle of asymmetrical loading; on the contrary, it may result in an adverse riding attitude.

The flow control means for the partition means of the present invention may take various forms. According to the present invention the flow control means may comprise an adjustable flap valve disposed in a passage in the rigid structure above or in the partition means. The flap valve may be adjusted by suitable actuation means so as to provide a desired flow cross section. When the passage is provided within the partition means, it is disposed directly below the rigid structure. This location is best suited for mounting a flap valve and to control the flap valve via an actuating member from the rigid structure.

As an alternative the flow control means of the present invention may comprise a pair of inflatable means, the internal pressure of which is used to determine the size of the through-flow-passage between said inflatable means. A further possibility would be to arrange the inflatable means so that the size of the through-flow-passage automatically changes as a result of varying pressure differences.

In connection with sidewall air cushion vehicles it has become known to use inflatable skirts to obtain an effective seal. According to the present invention, the partition means may comprise an inflatable partition skirt having an internal pressure determining the rate of sealing between the compartments. A relatively low internal pressure of the partition skirt results in a more effective balance of pressures between the compartments than a relatively high internal pressure. Accordingly, when the internal pressure of the partition skirt is made dependent on sensed parameters such as the pitch angle, pitch angle velocity or pressures in the compartments, it may also be used to control any balance flow between the compartments and thereby to optimize the riding attitude, in particular the pitch attitude of the vehicle.

A detailed description of embodiments of the present invention will follow with reference to the accompanying drawings. In the drawings, FIG. 1 schematically shows a sidewall air cushion vehicle in accordance with the present invention;

FIG. 4 schematically shows a central partition skirt of a sidewall air cushion vehicle of the present invention with a schematically indicated flow control means;

FIG. 5 is a side elevation of the partition skirt along the arrow 5 in FIG. 4;

FIG. 6 cross section of a central partition skirt of the sidewall air cushion vehicle of the present invention with a modified flow control means;

FIG. 7 shows a third embodiment of a flow control means for the partition skirt of a sidewall air cushion vehicle of the present invention.

Figure 1:
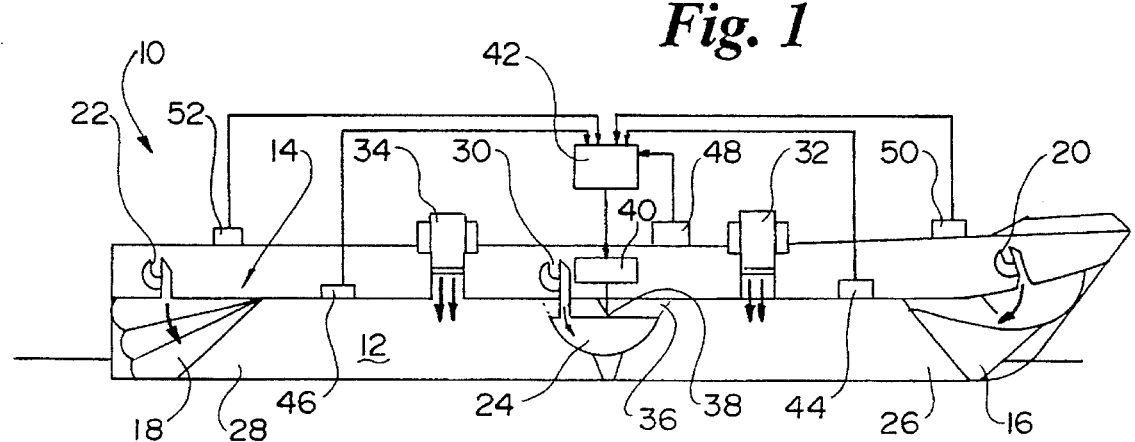

The sidewall air cushion vehicle 10 shown in FIG. 1 includes a pair of parallel body members of which one may be seen at 12 and which are connected to each other by a rigid structure 14. Between the body members a bow skirt 16 extends in the front area of the vehicle, and a stern skirt 18 extends in the rear area of the vehicle. The bow skirt 16 and the stern skirt 18 each are inflatable by fans 20 and 22, respectively, for sealing the space between skirts 16 and 18. This space is divided, at about the mid thereof, by a central partition skirt 24 so as to provide a front compartment 26 and a rear compartment 28. The partition skirt 24 is inflatable by a fan 30. Fans 32, 34 are associated with the compartments 26 and 28, respectively, so as to pressurize the compartments 26, 28 for generating air cushions to support the vehicle 10 in the water. As may be seen in FIG. 1, a passage 36 is provided in the area of the partition skirt 24 below the rigid structure 14. The passage 36 includes a pivotal flap valve 38 adapted to be pivoted by an actuating member 40 which is controlled by a processor 42. This arrangement is shown in FIG. 6 at an increased scale.

The compartments 26 and 28 have associated therewith pressure sensors 44 and 46, respectively, which pressure sensors are connected to the processor 42. A gyroscope 48 as well as a front motion sensor 50 and a rear motion sensor 52 are also connected to the processor 42. The sensors 50, 52 are arranged to sense for example the pitch angle of the vehicle, and by means of the gyroscope 48 the attitude of the vehicle 10 may be determined. When the vehicle 10 performs pitch movements in the water, there will result differences in pressure between the compartments 26, 28, which pressure differences may adversely influence the pitch attitude of the vehicle under certain circumstances. A pressure balance between the compartments 26 and 28 in a controlled manner will be obtained via the passage 36; the flow cross section of passage 36 will be determined by the position of the flap valve 38. The positioning thereof is obtained in response to the sensed values of the pitch angle or the pitch angle velocity which may be computed in the processor 42 from the sensed values of pitch angle. Furthermore, additionally or independent thereof the adjustment of flap valves 38 may be dependent on values that have been sensed by the pressure sensors 44 and 46.

Figure 2:
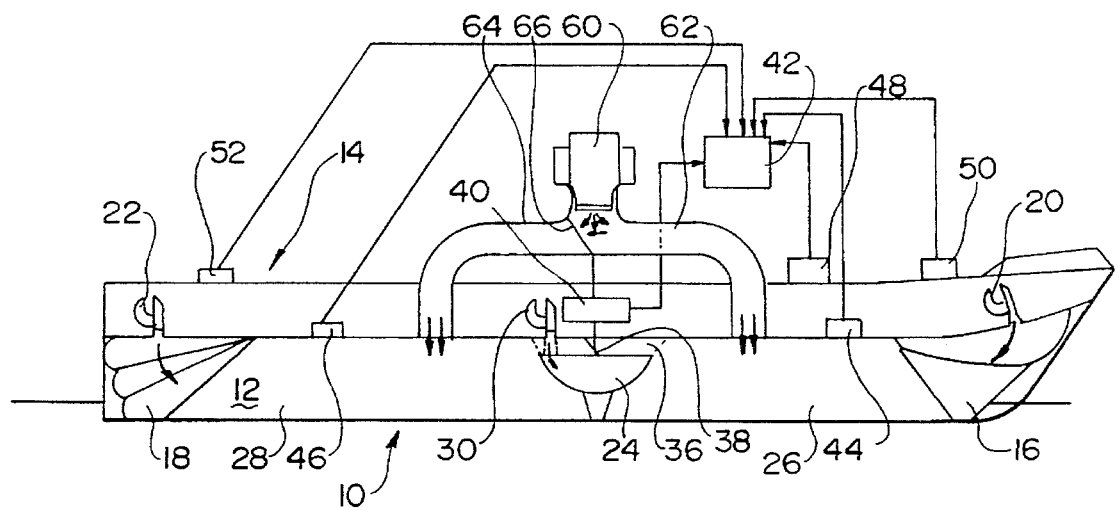
FIG. 2 shows another embodiment of a sidewall air cushion vehicle of the present invention.

With reference to FIG. 2, similar elements as in FIG. 1 have been designated by the same reference numerals. The sidewall air cushion vehicle shown in FIG. 2 differs from that of FIG. 1 in that a single fan 60 supplies pressurized air to the compartments 26 and 28 by a pair of passages 62 and 64. Distribution of the pressurized air to the compartments 26 and 28 is determined by the position of a flap 66 which is also actuated by actuating member 40. Control of the pitch attitude of the vehicle by pressure balance between the compartments 26 and 28 is obtained in the same manner as described with reference to FIG. 1.

Figure 3:
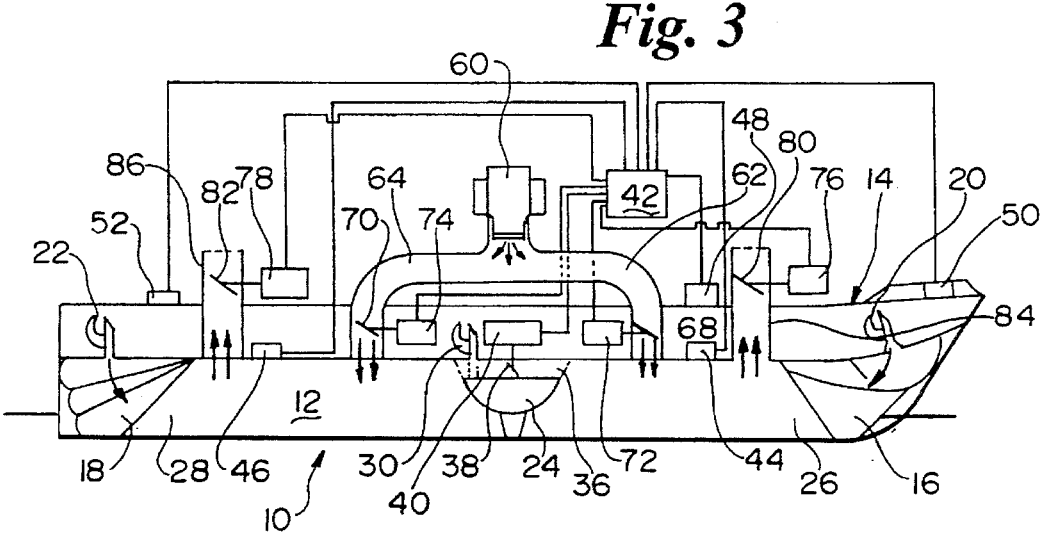
FIG. 3 shows a third embodiment of a sidewall air cushion vehicle of the present invention.

In FIG. 3 again similar elements as in FIG. 1 and 2 have been designated by the same reference numerals. Passages 62 and 64 each include a throttle flap valve 68 and 70, respectively, which are actuated by actuating members 72 and 74, respectively. The actuating members 72 and 74 are controlled by processor 42 which is also connected to actuating members 76, 78 for actuating flap valves 80, 82 in outlet channels 84, 86 for venting the compartments 26, 28. Accordingly, the compartments 26, 28 can be pressurized and vented in a controlled manner by means of fan 60 and discharge lines 84, 86, while additionally a pressure balance may be obtained via passage 36 in the partition skirt 24. Control of these components by the processor 42 is obtained such that the motion attitude of the vehicle 10 is optimized in accordance with the instant motion of the sea.

FIGS. 4 and 5 show a central partition skirt 90 which includes a passage 92 below the rigid structure 14. The passage 92 may be obturated by means of a pair of flexible tubes 94, 96. The pressure within the tubes 94, 96 determines the flow cross section thereof as indicated by dotted and full lines in FIG. 5. The air pressure within tubes 94, 96 is controlled in a similar manner as flap valves 36 in the embodiments of FIGS. 1 to 3 so as to provide a desired flow cross section for a desired pressure balance between the compartments 26 and 28.

The embodiment of FIG. 7 includes a partition skirt 100 which is for example of meandering shape. It is of continuous form up to the rigid structure 14 and may be bridged by a passage 102 in the rigid structure 14. The passage 102 includes a flap 104 which may be actuated in a similar manner as flap 38 in the embodiments of FIGS. 1 to 3 and 6.

I claim:

1. A sidewall air cushion vehicle comprising:

a pair of parallel body members which are connected to each other by a rigid structure above a water surface;

a flexible bow skirt in a front of the vehicle and a flexible stern skirt in a rear of the vehicle;

an air cushion space between the bow and stern skirts;

a partition extending transversely to a fore-aft-direction of the vehicle for dividing the space at substantially a mid thereof, so as to provide a pair of compartments which are separated from each other by the partition in a substantially fluid tight manner;

at least one fan connected to the compartments by a first duct for conducting a flow of air to provide an air cushion in the compartments;

a sensor for sensing pitch angle or pitch angle velocity of the vehicle, to be used as control parameters for control of pressure of air in the compartments;

the partition including a separate second duct including flow control means having an adjustable flow cross section and adapted for being actuated by actuating means; and the actuating means being responsive to control by the sensor, so that the flow cross section of the flow control means is adjusted in response to variables including the pitch angle, the pitch angle velocity of the vehicle, the pressures in the compartments, or a combination thereof.

2. A sidewall air cushion vehicle as defined in claim 1, wherein said partition means is constructed so as to be relatively soft and flexible when the pressures of the air in said compartments are substantially the same, and to be relatively stiff when there is a difference of pressures of the air in said compartments.

3. A sidewall air cushion vehicle as defined in claim 1, wherein said flow control means comprises an adjustable flap valve arranged in said second duct in said rigid structure above or within said partition means.

4. A sidewall air cushion vehicle as defined in claim 3, wherein said second duct said partition means is provided immediately below said rigid structure.

5. A sidewall air cushion vehicle as defined in claim 1, wherein said second duct within said partition means includes a pair of inflatable means arranged to provide a through-flow-passage therebetween the size of which is determined by the internal pressure of said inflatable means, the size of said through-flow-passage being dependent on any difference of pressures within said compartments if desired.

6. A sidewall air cushion vehicle as defined in claim 1, wherein said partition means comprises an inflatable partition skirt of a structure such that its internal pressure determines the amount of fluid tightness of the sealing between the compartments.

7. A sidewall air cushion vehicle comprising:

a pair of parallel body members which are connected to each other by a rigid structure above a water surface;

a flexible bow skirt in a front of the vehicle and a flexible stern skirt in a rear of the vehicle;

an air cushion space between the bow and stern skirts;

a partition extending transversely to a fore-aft-direction of the vehicle for dividing the space at substantially a middle thereof, so as to provide a pair of compartments which are separated from each other by the partition in a substantially fluid tight manner;

at least one fan connected to the compartments by a first duct for conducting a flow of air for providing an air cushion in the compartments;

a sensor for sensing pitch angle or pitch angle velocity of the vehicle, to be used as control parameters for control of air pressure in the compartments;

the partition including a separate second duct including flow control means having an adjustable flow cross section and adapted for being actuated by actuating means;

the actuating means being controlled by the sensor, so that the flow cross section of the flow control means is adjusted in response to variables including the pitch angle, the pitch angle velocity of the vehicle, the pressures in the compartments, or a combination thereof; and wherein the flow control means comprises an adjustable flap valve arranged in a passage in the rigid structure above or within the partition, wherein the passage within the partition includes a pair of inflatable means arranged to provide a through-flow-passage therebetween, a size of which is determined by internal pressure of the inflatable means, the size of the through-flow-passage being dependent on any difference of pressures within the compartments.

8. A sidewall air cushion vehicle comprising:

a pair of parallel body members which are connected to each other by a rigid structure above a water surface;

a flexible bow skirt in a front of the vehicle and a flexible stern skirt in a rear of the vehicle;

an air cushion space between the bow and stern skirts;

a partition extending transversely to a fore-aft-direction of the vehicle and dividing the space at substantially a mid thereof, so as to provide a pair of compartments which are separated from each other by the partition in a substantially fluid tight manner;

at least one fan connected to the compartments by a duct for conducting a flow of air for providing an air cushion in each of the compartments;

a sensor for sensing pitch angle or pitch angle velocity of the vehicle, to be used as control parameters for control of a by-pass passage bypassing the partition separately from the duct and including flow control means having an adjustable flow cross section and adapted for being actuated by actuating means; and the actuating means for being controlled by the sensor, so that the flow cross section of the flow control means is adjusted in response to variables including the pitch angle, the pitch angle velocity of the vehicle, the pressures in the compartments, and a combination thereof.

9. A sidewall air cushion vehicle as defined in claim 8, wherein the partition is constructed so as to be relatively soft and flexible when air pressures in the compartments are substantially equal, and to be relatively stiff when there is a difference between the air pressures in the compartments.

10. A sidewall air cushion vehicle as defined in claim 8, wherein the flow control means comprises an adjustable flap valve arranged in a passage in the rigid structure above or within the partition.

11. A sidewall air cushion vehicle as defined in claim 10, wherein the passage in the partition is provided immediately below the rigid structure.

12. A sidewall air cushion vehicle as defined in claim 10, wherein the passage within the partition includes a pair of inflatable means arranged for providing a through-flow-passage therebetween, a size of which is determined by internal pressure of the inflatable means, the size of the through-flow-passage being dependent on any difference of pressures within the compartments.

13. A sidewall air cushion vehicle as defined in claim 8, wherein the partition comprises an inflatable partition skirt of a structure, such that its internal pressure determines an amount of fluid tightness of sealing between the compartments.

14. A sidewall air cushion vehicle comprising:

a pair of parallel body members which are connected to each other by a rigid structure above a water surface;

a flexible bow skirt in a front of the vehicle and a flexible stern skirt in a rear of the vehicle;

an air cushion space between the bow and stern skirts;

a partition extending transversely to a fore-aft-direction of the vehicle and dividing the space at substantially a mid thereof, so as to provide a pair of compartments which are separated from each other by the partition in a substantially fluid tight manner;

at least one fan connected to the compartments by a first duct for conducting a flow of air for providing an air cushion in the compartments;

a sensor for sensing pitch angle or pitch angle velocity of the vehicle, to be used as control parameters for control of air pressure in the compartments;

the partition including a separate second duct including flow control means having an adjustable flow cross section and adapted for being actuated by actuating means;

the actuating means being controlled by the sensor, so that the flow cross section of the flow control means is adjusted in response to variables including the pitch angle, the pitch angle velocity of the vehicle, the pressures in the compartments, or a combination thereof; and wherein the flow control means comprises an adjustable flap valve arranged in a passage in the rigid structure above or within the partition, wherein the passage in the partition is provided immediately below the rigid structure.

* * * * *